United States Patent [19]

Sasaki et al.

[11] Patent Number: 5,134,104
[45] Date of Patent: Jul. 28, 1992

[54] LIQUID CATALYST COMPONENT, CATALYST SYSTEM CONTAINING SAID COMPONENT AND PROCESS FOR PRODUCING ETHYLENE-α-OLEFIN COPOLYMER USING SAID CATALYST SYSTEM

[75] Inventors: Toshio Sasaki; Hirofumi Jyohouji; Yoshihiro Miyoshi; Takeshi Ebara, all of Ichihara; Kiyoshi Kawai, Chiba, all of Japan

[73] Assignee: Sumitomo Chemical Company, Limited, Osaka, Japan

[21] Appl. No.: 705,788

[22] Filed: May 28, 1991

Related U.S. Application Data

[62] Division of Ser. No. 370,021, Jun. 22, 1989, Pat. No. 5,039,766.

[30] Foreign Application Priority Data

Jun. 28, 1988 [JP] Japan .................. 63-162112

[51] Int. Cl.$^5$ .................................................. C08F 4/64
[52] U.S. Cl. ................................ 502/103; 502/123; 556/51; 556/54; 556/56
[58] Field of Search ............. 502/103; 556/51, 54, 556/56

[56] References Cited

U.S. PATENT DOCUMENTS

| | | | |
|---|---|---|---|
| 3,919,180 | 11/1975 | Furukawa et al. | 526/140 X |
| 4,211,671 | 7/1980 | Hoff | 502/115 |
| 4,477,586 | 10/1984 | McDaniel | 502/104 |
| 4,542,197 | 9/1985 | Giannini et al. | 526/161 X |
| 4,663,403 | 5/1987 | McDaniel | 526/97 |

FOREIGN PATENT DOCUMENTS

| | | |
|---|---|---|
| 661389 | 9/1965 | Belgium . |
| 0271874 | 12/1987 | European Pat. Off. . |
| 2044343 | 9/1979 | Fed. Rep. of Germany . |
| 6515980 | 7/1965 | Japan . |
| 515379 | 3/1966 | Japan . |
| 4211646 | 7/1967 | Japan . |
| 4222691 | 11/1967 | Japan . |
| 4742039 | 10/1972 | Japan . |
| 5984905 | 5/1984 | Japan . |

OTHER PUBLICATIONS

Journal of Polymer Sciences 11:3161 (1973).
Tajima et al., J. Polym. Sc. Part A-1, vol. 6, 241 (1968) "Ethylene Polymerization by Titanium Compounds Containing . . . ".

*Primary Examiner*—Patrick P. Garvin
*Attorney, Agent, or Firm*—Stevens, Davis, Miller & Mosher

[57] ABSTRACT

A liquid catalyst component for copolymerization of ethylene with α-olefin comprising a titanium compound represented by the following general formula:

$$(R^1R^2N)_{4-(m+n)}TiX_mY_n$$

wherein $R^1$ and $R^2$ each represents a saturated hydrocarbon group having 8 to 30 carbon atoms; X represents halogen; Y represents an alkoxy group; m represents a number satisfying $1 \leq m \leq 3$; n represents a number satisfying $0 \leq n \leq 2$; and $(m+n)$ satisfies $1 \leq (m+n) \leq 3$.

Said liquid catalyst component is used in combination with an organoaluminum compound as a catalyst system for copolymerization of ethylene with α-olefin.

7 Claims, 3 Drawing Sheets

FIG. 5

(A) TRANSITION METAL COMPONENT $(R^1R^2N)_{4-(m+n)}Ti X_m Y_n$ $R^1$ AND $R^2$ ARE $C_8-C_{30}$ SATURATED HYDROCARBON GROUPS, X IS HALOGEN, Y IS ALKOXY GROUP, $1 \leq m \leq 3$, $0 \leq n \leq 2$, $1 \leq (m+n) \leq 3$ (B) ORGANOMETAL COMPONENT

ORGANOALUMINUM COMPOUND

ETHYLENE-α-OLEFIN (—NON-CONJUGATED DIENE) COPOLYMER

LIQUID CATALYST COMPONENT, CATALYST SYSTEM CONTAINING SAID COMPONENT AND PROCESS FOR PRODUCING ETHYLENE-α-OLEFIN COPOLYMER USING SAID CATALYST SYSTEM

This is a division of application Ser. No. 07/370,021, filed Jun. 22, 1989 and now U.S. Pat. No. 5,039,766.

BACKGROUND OF THE INVENTION

1. Field of the Invention

This invention relates a liquid catalyst component, a catalyst system containing said catalyst component for copolymerization of ethylene with α-olefins and a process for producing ethylene-α-olefin copolymers using said catalyst system, and more particularly to a process for producing ethylene-α-olefin copolymers excellent in structural randomness, weather resistance, color protection, corrosion resistance, low temperature property and dynamic property by the use of said novel catalyst system.

2. Description of the Prior Art

As a general process for producing ethylene-α-olefin copolymers, the process using a catalyst consisting of a compound of transition metal belonging to Group IV to VI of the periodic table and an organometallic compound of a metal belonging to Group I to III of the periodic table, i.e. the so-called Ziegler-Natta catalyst, is widely known.

On the other hand, ethylene-α-olefin copolymers are requested to have a narrow composition distribution from the viewpoint of practical properties. Thus, in the industry, they are produced by the use of a catalyst system consisting of a vanadium compound such as $VCl_3$, $VOCl_3$, $VO(OR)_3$ or the like and an alkylaluminum halide such as $Et_3Al_2Cl_3$ or the like.

However, although the ethylene-α-olefin copolymers produced with the above-mentioned catalyst system are narrow in composition distribution, the process is low in productivity because the catalyst has a low polymerization activity at high temperatures. Further, this process has problems that the residual vanadium and chlorine cause coloration of the resulting polymer, deteriorate its weather resistance and promote its corrosion. Accordingly, ashes must be thoroughly eliminated from the polymer in order to prevent these problems.

Further, the process using the above-mentioned catalyst system is disadvantageous in that, if ethylene and higher α-olefin are copolymerized with the catalyst system, the resulting copolymer is very low in molecular weight and cannot have a satisfactory mechanical strength, and in addition catalyst activity is very low.

In view of the above-mentioned circumstance, a process using a catalyst system consisting of a titanium compound or a zirconium compound and an aluminum compound has been disclosed, and recently a process using a catalyst system consisting of a titanium compound or a zirconium compound and aluminoxane has been proposed.

However, the ethylene-α-olefin copolymers produced with these catalyst systems have a low molecular weight, and they cannot be said to be satisfactory from the viewpoint of practical properties.

On the other hand, as a process for polymerizing or copolymerizing olefins by the use of a catalyst system consisting of a compound having titanium-nitrogen bond and an organoaluminum compound, there have been disclosed a process for polymerizing ethylene with a catalyst system consisting of an organoaluminum compound and a solid component prepared by supporting a titanium amide compound or an alkali metal salt of titanium amide compound on magnesium halide (DE-OS 2,030,753), a process for copolymerizing ethylene and α-olefin with a catalyst system consisting of aluminoxane and a titanium amide compound having π-allyl ligand [Japanese Patent Application Kokai (Laid-Open) No. 62-121708], a process for polymerizing ethylene or copolymerizing ethylene and α-olefin with a catalyst system consisting of a titanium diphenylamide compound and an organoaluminum compound (EP-A-0 104 374), a process for polymerizing α-olefin or copolymerizing ethylene and α-olefin with a catalyst system consisting of a titanium amide compound having an aryl substituent and an organoaluminum compound (Japanese Patent Publication No. 42-22691), a process for homopolymerizing ethylene or α-olefin or copolymerizing ethylene and α-olefin with a catalyst system consisting of an organoaluminum compound and a lower alkyl group-containing titanium amide compound such as diethylamido-titanium trichloride and the like [Japanese Patent Publication No. 41-5379; J. Polymer Sci., Part A-1, 241, 6 (1968)], a process for polymerizing ethylene with a catalyst system consisting of tetrakisdiphenylamido-titanium and an organoaluminum compound (Japanese Patent Publication No. 42-11646), etc.

However, when applied to the copolymerization of ethylene and α-olefin, all the catalyst systems disclosed in the above-mentioned references are disadvantageous in the following points. Thus, the process of DE-OS 2,030,753 is disadvantageous in that the resulting ethylene-α-olefin copolymer has a broad composition distribution; the process of Japanese Patent Application Kokai (Laid-Open) No. 62-121708 is disadvantageous in that the resulting copolymer has a low molecular weight; and the processes of EP-A-O 104 374, Japanese Patent Publication No. 41-5379, Japanese Patent Publication No. 42-22691 and J. Polymer Sci., Part A-1, 241, 6 (1968) are disadvantageous in that composition distribution of the resulting copolymer is yet unsatisfactory in narrowness. Further, the process of Japanese Patent Publication No. 42-11646 is disadvantageous in that the resulting copolymer is yet unsatisfactory in narrowness of composition distribution and the catalyst is insufficient in activity.

SUMMARY OF THE INVENTION

In the above-mentioned situation, the object of this invention is to provide a process for producing an ethylene-α-olefin copolymer having a narrow composition distribution and a high molecular weight and improved in weather resistance, color protection, corrosion resistance and low temperature property by the use of a novel catalyst system.

According to this invention, there is provided a liquid catalyst component comprising:

a liquid catalyst compponent comprising a titanium compound represented by the following general formula:

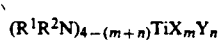

$$(R^1R^2N)_{4-(m+n)}TiX_mY_n$$

wherein $R^1$ and $R^2$ each represents a saturated hydrocarbon group having 8 to 30 carbon atoms, X represents a halogen, Y represents an alkoxy group, m represents a number satisfying $1 \leq m \leq 3$, n represents a number satisfying $0 \leq n \leq 2$, and $(m+n)$ satisfies $1 \leq (m+n) \leq 3$; a catalyst system for copolymerization of ethylene with α-olefin comprising:

(A) the above-mentioned liquid catalyst component and (B) an organoaluminum compound;

as well as a process for producing an ethylene-α-olefin copolymer (hereinafter simply referred to as "copolymer") which comprises copolymerizing ethylene with α-olefin by using said catalyst system.

Owing to the use of the catalyst system of this invention, it becomes possible to produce an ethylene-α-olefin copolymer excellent in structural randomness, and an ethylene-α-olefin copolymer excellent in weather resistance, corrosion resistance, transparency, unstickiness and dynamic properties can be provided.

BRIEF DESCRIPTION OF THE DRAWINGS

FIG. 5 is a flow chart diagram for facilitating to understand this invention which expresses a non-limitative typical example of the embodiment of this invention.

Figure 2:
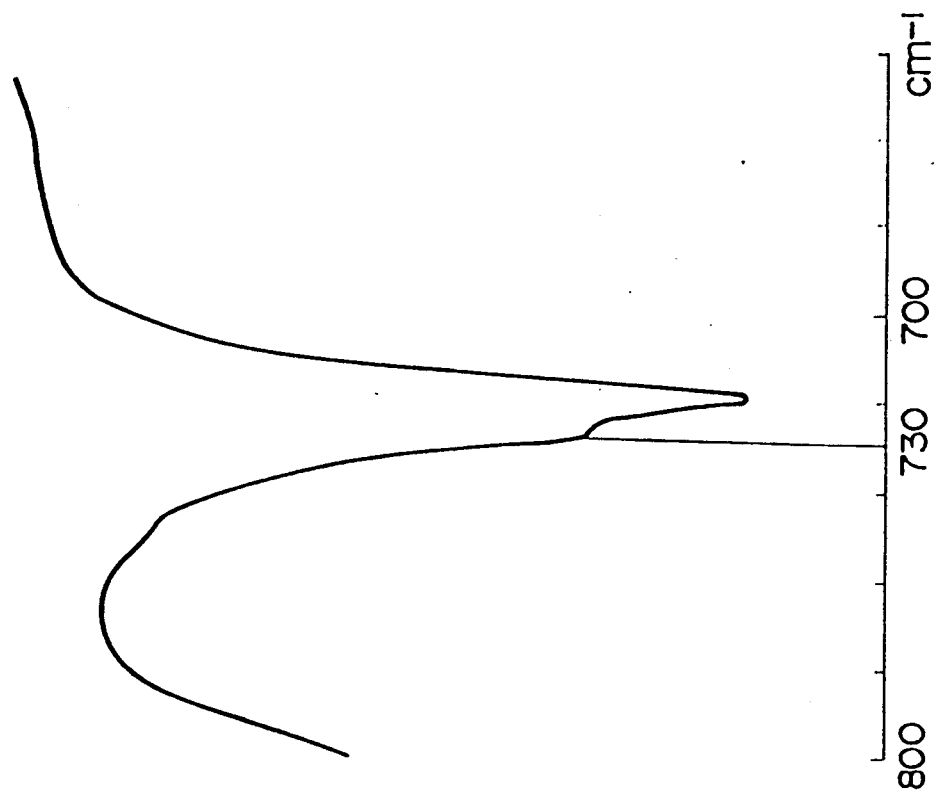
FIGS. 2 to 4 are infrared absorption spectral charts of copolymers obtained according to prior technique in Comparative Examples 1, 3, and 5.

DETAILED DESCRIPTION OF THE INVENTION (a) Liquid catalyst component (A) used in this invention is a secondary amide group-containing titanium compound represented by the following general formula:

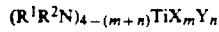

$$(R^1R^2N)_{4-(m+n)}TiX_mY_n$$

wherein $R^1$ and $R^2$, which may be identical or different from each other, each represents a saturated hydrocarbon group having 8 to 30 carbon atoms, X represents a halogen, Y represents an alkoxy group, m represents a number satisfying $1 \leq m \leq 3$, n represents a number satisfying $0 \leq n \leq 2$, and $(m+n)$ satisfies $1 \leq (m+n) \leq 3$.

If $R^1$ and $R^2$ each represents unsaturated hydrocarbon group, a composition distribution of the resulting copolymer is broad. In this invention, therefore, saturated hydrocarbon groups are used as $R^1$ and $R^2$. Among the saturated hydrocarbon groups, aliphatic hydrocarbon groups having 8 to 30 carbon atoms are preferable, and straight chain aliphatic saturated hydrocarbon groups having 8 to 30 carbon atoms are particularly preferable because, as the carbon chain becomes closer to a straight chain, the titanium compound becomes liquid state and composition distribution of the resulting copolymer becomes narrower. As examples of the halogen represented by X in the general formula, chlorine, bromine, iodine, etc. can be referred to, among which chlorine is most preferable from the viewpoint of catalyst activity.

As examples of the alkoxy group, methoxy, ethoxy, propoxy, butoxy, 2-ethylhexyloxy and the like can be referred to. There is no limitation from the viewpoint of catalyst performance.

If $(m+n)$ in the general formula is greater than 3, free $TiCl_4$ exists in the titanium compound which broadens composition distribution of the resulting copolymer. If $(m+n)$ is smaller than 1, catalyst activity is low. Accordingly, titanium compounds of which $(m+n)$ satisfies $1 \leq (m+n) \leq 3$ are preferably used in this invention.

Concrete examples of such preferable titanium compound include titanium trichloride dioctylamido, titanium dichloride bis(dioctylamido), titanium chloride tris(dioctylamido), titanium trichloride didecylamido, titanium dichloride bis(didecylamido), titanium chloride tris(didecylamido), titanium trichloride dioctadecylamido, titanium dichloride bis(dioctadecylamido), titanium chloride tris(dioctadecylamido), titanium dichloride dioctylamido ethoxide, titanium butoxide dichloride dioctylamido, titanium dichloride dioctylamido hexyloxide, titanium dichloride dioctylamido 2-ethylhexyloxide, titanium dichloride dioctylamido decyloxide, titanium dichloride didecylamido ethoxide, titanium dichoride didecylamido hexyloxide, titanium dichloride didecylamido 2-ethylhexyloxide, titanium dichloride dioctadecylamido ethoxide, titanium dichloride dioctadecylamido 2-ethylhexyloxide, titanium chloride bis(dioctylamido) hexyloxide, titanium chloride bis(dioctylamido) 2-ethylhexyloxide, titanium chloride bis(dioctylamido) decyloxide, titanium chloride bis(didecylamido) hexyloxide, titanium chloride bis(didecylamido) 2-ethylhexyloxide, titanium chloride bis(didecylamido) decyloxide, and the like.

Among the above, more preferable titanium compounds are titanium trichloride dioctylamido, titanium dichloride bis(dioctylamido), titanium trichloride didecylamido, titanium dichloride bis(didecylamido), titanium trichloride dioctadecylamido and titanium dichloride bis(dioctadecylamido).

As the method for synthesizing such secondary amide group-containing titanium compounds, the methods mentioned in Japanese Patent Publication No. 41-5379; Japanese Patent Publication No. 42-11646; H. Büger et al.: J. Organomet. Chem. 108 (1976), 69–84; H. Büger et al.: J. Organomet. Chem. 20 (1969), 129–139; etc. can be used.

In this invention, the above-mentioned secondary amide group-containing titanium compounds are synthesized according to the methods as mentioned above in the following manner:

(i) A secondary amine compound represented by the general formula $R^5R^6NH$ (wherein $R^5$ and $R^6$ each represents a saturated hydrocarbon group having 8 to 30 carbon atoms, preferably an aliphatic saturated hydrocarbon group having 8 to 30 carbon atoms, more preferably a straight chain aliphatic hydrocarbon group having 8 to 30 carbon atoms in view of liquefaction of the formed titanium compound) is allowed to react with (ii) an alkyl alkali metal compound represented by the general formula $R^7M$ (wherein $R^7$ represents a hydrocarbon group having 1 to 30 carbon atoms and M represents an alkali metal such as Li, K and the like) to synthesize an amide compound of alkali metal, (iii) and then the amide compound of alkali metal is allowed to react with a titanium tetrahalide represented by the general formula $TiX_4$ (wherein X represents chlorine, bromine, iodine and the like, among which chlorine is preferable).

(b) The organoaluminum compound used in this invention as catalyst component (B) is selected from known organoaluminum compounds.

As its preferable examples, organoaluminum compounds represented by general formula $R^3{}_aAlM_{3-a}$ and chain-like or cyclic aluminoxanes represented by general formula $[Al(R^4)-O]_l$ can be referred to.

In these formulas, $R^3$ and $R^4$ are hydrocarbon groups having 1 to 8 carbon atoms, and they may be identical or different from each other; M is hydrogen atom and/or alkoxy group; a is a number satisfying $0 < a \leq 3$, and l is an integer of 2 or greater.

Concrete examples of the organoaluminum compound represented by general formula $R^3{}_a AlM_{3-a}$ include trialkylaluminums such as trimethylaluminum, triethylaluminum, tripropylaluminum, triisobutylaluminum, trihexylaluminum and the like; dialkylaluminum hydrides such as dimethylaluminum hydride, diethylaluminum hydride, dipropylaluminum hydride, diisobutylaluminum hydride, dihexylaluminum hydride and the like; alkylaluminum alkoxides such as dimethylaluminum methoxide, methylaluminum dimethoxide, diethylaluminum methoxide, ethylaluminum dimethoxide, diisobutylaluminum methoxide, isobutylaluminum dimethoxide, dihexylaluminum methoxide, hexylaluminum dimethoxide, dimethylaluminum ethoxide, methylaluminum diethoxide, diethylaluminum ethoxide, ethylaluminum diethoxide, diisobutylaluminum ethoxide, isobutylaluminum diethoxide and the like; etc.

Concrete examples of the aluminoxane represented by general formula $\{Al(R^4)-O\}_l$ include tetramethyldialuminoxane, tetraethyldialuminoxane, tetrabutyldialuminoxane, tetrahexyldialuminoxane, methylaluminoxane, ethylaluminoxane, butylaluminoxane, hexylaluminoxane, and the like. The amount of component (B) can be widely varied in the range of 1 to 100,000 moles per one mole of titanium atom in component (A). Preferably, however, component (B) is used in an amount ranging from 1 to 10,000 moles and more preferably from 1 to 5,000 moles, per one mole of titanium atom in component (A).

(c) The monomers constituting a copolymer in this invention are ethylene and at least one kind of α-olefin(s).

Concrete examples of said α-olefin include propylene, butene-1, pentene-1, hexene-1, 4-methylpentene-1, octene-1, decene-1, octadecene-1, eicosene-1 and the like.

In addition to the above-mentioned monomers, a non-conjugated diene may additionally be copolymerized for the purpose of improving the vulcanizability of copolymer. Concrete examples of said non-conjugated diene include dicyclopentadiene, tricyclopentadiene, 5-methyl-2,5-norbornadiene, 5-methylene-2-norbornene, 5-ethylidene-2-norbornene, 5-isopropenyl-2-norbornene, 5-(2'-butenyl)-2-norbornene, 1,5,9-cyclododecatriene, 6-methyl-4,7,8,9-tetrahydroindene, trans-1,2-divinylcyclobutane, 1,4-hexadiene, 4-methyl-1,4-hexadiene, 1,3-hexadiene, 1,6-octadiene, 6-methyl-1,5-heptadiene, and the like. This invention is not limited by the compounds mentioned above.

The copolymer of this invention can have a density so widely ranging as from 0.85 to 0.95 (g/cm³). From the viewpoint of flexibility at low temperatures, however, density of the copolymer is preferably 0.85 to 0.94, more preferably 0.85 to 0.92, and particularly preferably 0.85 to 0.90. Further, it is preferably a rubber-like random copolymer having a narrow composition distribution of which infrared absorption spectrum shows no absorption of 730 cm$^{-1}$ assignable to ethylene crystal chain at all.

Further, the copolymer may involve two or more kinds of α-olefins and two or more kinds of non-conjugated dienes.

(d) The method for supplying the catalyst components into the polymerization reactor is not critical, provided that the catalyst components must be supplied in a moisture-free state in an inert gas such as nitrogen, argon and the like. Catalyst components (A) and (B) may be supplied either separately or after a previous mutual contact.

The polymerization can be practised at a temperature ranging from $-30°$ C. to $300°$ C. However, the polymerization temperature is preferably $-10°$ C. to $200°$ C. and particularly preferably $20°$ C. to $150°$ C.

Although pressure of the polymerization is not critical, a pressure of about 3 atmospheres to about 1,500 atmospheres is preferred from the industrial and economical points of view.

As the mode of polymerization, both continuous and batch systems can be adopted. Further, a slurry polymerization using an inert hydrocarbon solvent such as propane, butane, pentane, hexane, heptane or octane, a liquid phase polymerization using no solvent, and a gas phase polymerization are all adoptable, too.

Further, a chain transfer agent such as hydrogen and the like may be added for the purpose of regulating the molecular weight of the copolymer of this invention.

Next, this invention will be explained in more detail by way of the following examples and comparative examples.

The α-olefin content, iodine number, glass transition point and intrinsic viscosity mentioned in the examples were measured by the following methods.

Thus, α-olefin content was determined from the characteristic absorption of ethylene and α-olefin by the use of infrared spectrophotometer JASCO-302 manufactured by Nippon Bunko Kogyo K. K.

Iodine number was determined from the characteristic absorption of diene by the use of the same infrared spectrophotometer as above.

Glass transition point ($T_g$) was measured by differential scanning calorimeter (SSC-5000 DSC-100, manufactured by Seiko Denshi Kogyo K. K.).

Intrinsic viscosity [η] was measured in tetralin solution at 135° C. with Ubbellohde viscometer.

Density was measured according to JIS K-6760.

In the examples and comparative examples presented below, randomness in the sequence of ethylene and α-olefin, i.e. the narrowness in the composition distribution, in copolymer was evaluated based on the existence of 730 cm$^{-1}$ peak (absorption due to crystalline polyethylene) in infrared absorption spectrum. That is, when the absorption at 730 cm$^{-1}$ was observable clearly or as a shoulder in the infrared absorption spectrum of copolymer, the composition distribution was taken as broad. When the absorption was not noticeable at all, the composition distribution was taken as narrow.

EXAMPLE 1

(I) Synthesis of Secondary Amino Group-Containing Titanium Compound (A)

After replacing the inner atmosphere of a 300 ml flask equipped with a stirrer, a dropping funnel and a thermometer with argon gas, 3.0 ml (20 millimoles) of dioctylamine and 50 ml of hexane were charged.

Then, 12.6 ml (20 millimoles) of butyllithium diluted with hexane was dropped from the dropping funnel over a period of 30 minutes, while keeping the inner temperature of the flask at 5° C. After dropping it, the mixture was additionally reacted at 5° C. for 2 hours and then at 30° C. for 2 hours.

Subsequently, 2.2 ml (20 millimoles) of TiCl$_4$ diluted with hexane was dropped from the dropping funnel into the reacted mixture over a period of 30 minutes, while keeping the inner temperature of the flask at 5° C. After dropping it, the resulting mixture was additionally reacted at 5° C. for one hour and then at 30° C. for 2 hours. Thus, 20 millimoles (because the yield could be regarded as 100%) of a titanium compound represented by composition formula $(C_8H_{17})_2NTiCl_3$ was obtained.

(II) Copolymerization of Ethylene and Propylene

After replacing the inner atmosphere of a 300 ml flask equipped with a stirrer, a reflux condenser, a gas blowing tube and a thermometer with argon gas, 200 ml of n-heptane and 1.2 ml (5.0 millimoles) of triisobutylaluminum were charged. Then, a gas mixture of ethylene ($C_2'$) and propylene ($C_3'$) [composition of gas phase (hereinafter, all expressed in terms of ratio by volume) $C_2'/C_3'=2/8$] was blown into the solution through the blowing tube till a saturation was reached. Then, 0.25 millimole of the titanium compound obtained in (I) was added to start a polymerization.

After continuing the polymerization for one hour while supplying the gas mixture at a constant temperature of 30° C., 20 ml of ethanol was added to stop the polymerization.

The resulting polymer was washed three times with each 1,000 ml portion of a mixture consisting of 950 ml of ethanol and 50 ml of 1N hydrochloric acid and then dried in vacuum to obtain 2.2 g of an ethylene-propylene copolymer (hereinafter referred to as "EP copolymer"). The catalyst activity per one mole of titanium atom (hereinafter, simply referred to as "activity") was $8.8 \times 10^3$ g/mole Ti.

Figure 1:
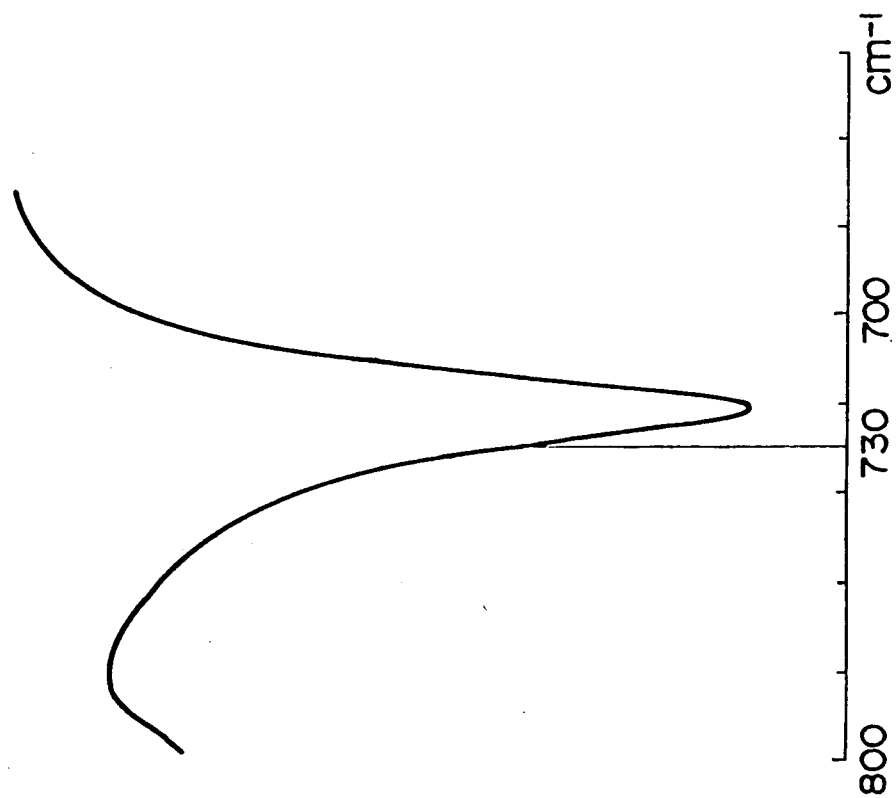
FIG. 1 is an infrared absorption spectral chart of a copolymer obtained in Example 1 of this invention.

FIG. 1 illustrates an infrared absorption spectrum of the polymer thus formed. In FIG. 1, no absorption at 730 cm$^{-1}$ due to crystalline chain of ethylene (hereinafter, referred to as "IR$_{730}$") was observed, demonstrating that the polymer was a copolymer having a narrow composition distribution. In the copolymer, content (% by weight) of ethylene (hereinafter, simply referred to as "ethylene content") was 62.1%. Its intrinsic viscosity (hereinafter, simply referred to as $[\eta]$) was 2.5, density (g/cm$^3$) (hereinafter, simply referred to as "d") was 0.879, and its glass transition point ($T_g$) was $-59.0°$ C.

EXAMPLE 2

A copolymerization of ethylene and propylene was carried out in the same manner as in Example 1 (II), except that composition of gas mixture $C_2'/C_3'$ was equal to 5/5 and 0.5 millimoles of $(C_8H_{17})_2NTiCl_3$ was used. As the result, 8.1 g of an EP copolymer was obtained.

Activity was $1.6 \times 10^4$ g/mole Ti. The copolymer thus formed showed no IR$_{730}$, demonstrating that it was a copolymer having a narrow composition distribution. Ethylene content was 74.3%, $[\eta]=4.4$, d=0.873, and $T_g = -59.1°$ C.

EXAMPLE 3

A copolymerization of ethylene and propylene was carried out in the same manner as in Example 1 (II), except that the $(C_8H_{17})_2NTiCl_3$ was replaced with 0.44 millimole of a titanium compound having a composition formula $[(C_8H_{17})_2N]_2TiCl_2$. As the result, 2.64 g of an EP copolymer was obtained.

Activity was $6.0 \times 10^3$ g/mole Ti. The copolymer thus formed showed no IR$_{730}$, demonstrating that it was a copolymer having a narrow composition distribution. Ethylene content was 51.4%, $[\eta]=5.4$, d=0.873, and $T_g = -59.0°$ C.

EXAMPLE 4

A copolymerization of ethylene and propylene was carried out in the same manner as in Example 3, except that the triisobutylaluminum was replaced with 5 ml of n-heptane of isobutylaluminum dimethoxide (5.0 millimoles) and 0.15 millimoles of $(C_8H_{17})_2NTiCl_3$ was used. As the result, 3.6 g of an EP copolymer was obtained. Activity was $2.4 \times 10^4$ g/mole Ti. The copolymer thus formed showed no IR$_{730}$, demonstrating that it was a copolymer having a narrow composition distribution. Ethylene content was 48.6%, $[\eta]=4.2$, d=0.867, and $T_g = -59.0°$ C.

EXAMPLE 5

A copolymerization of ethylene and propylene was carried out in the same manner as in Example 1 (II), except that the $(C_8H_{17})_2NTiCl_3$ was replaced with 0.44 millimole of a titanium compound having a composition formula $[(C_8H_{17})_2TiCl_2$ and $C_2'/C_3'$ was equal to 5/5. As the result, 7.8 g of an EP copolymer was obtained. Activity was $1.8 \times 10^4$ g/mole Ti. The copolymer thus formed showed no IR$_{730}$, demonstrating that it was a copolymer having a narrow composition distribution. Ethylene content was 74.3%, $[\eta]=4.7$, d=0.901, and $T_g = -59.1°$ C.

EXAMPLE 6

A copolymerization of ethylene and propylene was carried out in the same manner as in Example 1 (II), except that the $(C_8H_{17})_2NTiCl_3$ was replaced with 0.5 millimole of a titanium compound having a composition formula $(C_{10}H_{21})_2NTiCl_3$. As the result, 4.5 g of an EP copolymer was obtained. Activity was $8.9 \times 10^3$ g/mole Ti. The copolymer thus formed showed no IR$_{730}$, demonstrating that it was a copolymer having a narrow composition distribution. Ethylene content was 72.6% $[\eta]=2.6$, d=0.870, and $T_g = -59.1°$ C.

EXAMPLE 7

A copolymerization of ethylene and propylene was carried out in the same manner as in Example 1 (II), except that the $(C_8H_{17})_2NTiCl_3$ was replaced with 0.5 millimole of a titanium compound having the following composition formula:

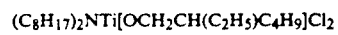

$(C_8H_{17})_2NTi[OCH_2CH(C_2H_5)C_4H_9]Cl_2$

As the result, 3.4 g of an EP copolymer was obtained. Activity was $6.8 \times 10^3$ g/mole Ti. The copolymer thus formed showed no IR$_{730}$, demonstrating that it was a copolymer having a narrow composition distribution. Ethylene content was 54.7%, $[\eta]=2.4$, d=0.865, and $T_g = -59.0°$ C.

COMPARATIVE EXAMPLE 1

A copolymerization of ethylene and propylene was carried out in the same manner as in Example 1 (II), except that the $(C_8H_{17})_2NTiCl_3$ was replaced with 0.25 millimole of TiCl$_4$. As the result, 1.2 g of an EP copolymer was obtained. Activity was $4.5 \times 10^3$ g/mole Ti.

FIG. 2 illustrates an infrared absorption spectrum of the copolymer thus formed. In FIG. 2, $IR_{730}$ due to crystalline ethylene chain is clearly observed, demonstrating that the copolymer had a broad composition distribution. Ethylene content was 62.5%, and $[\eta]$ was 2.7.

COMPARATIVE EXAMPLE 2

A copolymerization of ethylene and propylene was carried out in the same manner as in Example 1 (II), except that the $(C_8H_{17})_2NTiCl_3$ was replaced with 0.015 millimole of a titanium compound having composition formula $(C_5H_5)_2TiCl_2$ (Titanocenedichloride, $Cp_2TiCl_2$) and the triisobutylaluminum was replaced with methylaluminoxane (0.3 millimole) in 5 ml of toluene. As the result, 0.6 g of an EP copolymer was obtained. Activity was $1.2 \times 10^4$ g/mole Ti. Although the polymer obtained herein showed no $IR_{730}$, its $[\eta]$ was as low as 0.3. Ethylene content was 60.1%.

COMPARATIVE EXAMPLE 3

Figure 3:
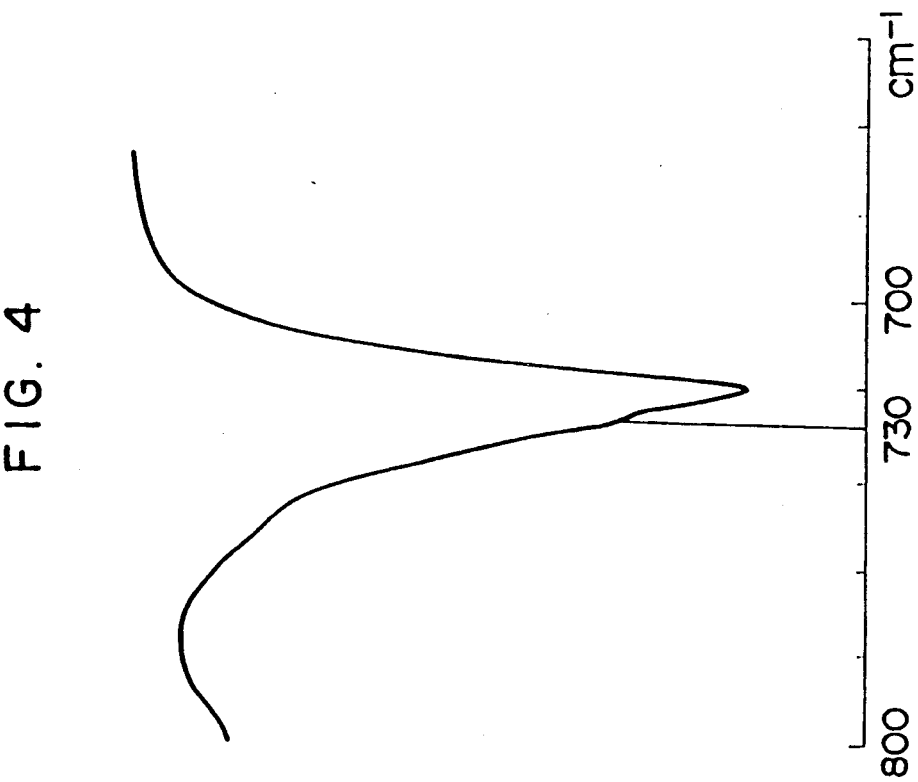

A copolymerization of ethylene and propylene was carried out in the same manner as in Example 1 (II), except that the $(C_8H_{17})_2NTiCl_3$ was replaced with 0.05 millimole of a titanium compound having composition formula $(C_6H_5)_2NTiCl_3$. As the result, 1.6 g of an EP copolymer was obtained. Activity was $3.2 \times 10^4$ g/mole Ti. FIG. 3 illustrates an infrared absorption spectrum of the copolymer thus obtained. In FIG. 3, $IR_{730}$ due to crystalline ethylene chain is somewhat clearly observed demonstrating that the polymer had a broad composition distribution. Ethylene content was 59.0%, and $[\eta]$ was 2.8.

COMPARATIVE EXAMPLE 4

A copolymerization of ethylene and propylene was carried out in the same manner as in Example 1 (II), except that the $(C_8H_{17})_2NTiCl_3$ was replaced with 0.58 millimole of a titanium compound having composition formula

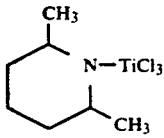

As the result, 6.8 g of an EP copolymer was obtained. Activity was $1.2 \times 10^4$ g/mole Ti. The copolymer thus obtained showed $IR_{730}$, demonstrating that it had a broad composition distribution. Ethylene content was 57.0%, and $[\eta]$ was 4.8.

COMPARATIVE EXAMPLE 5

Figure 4:
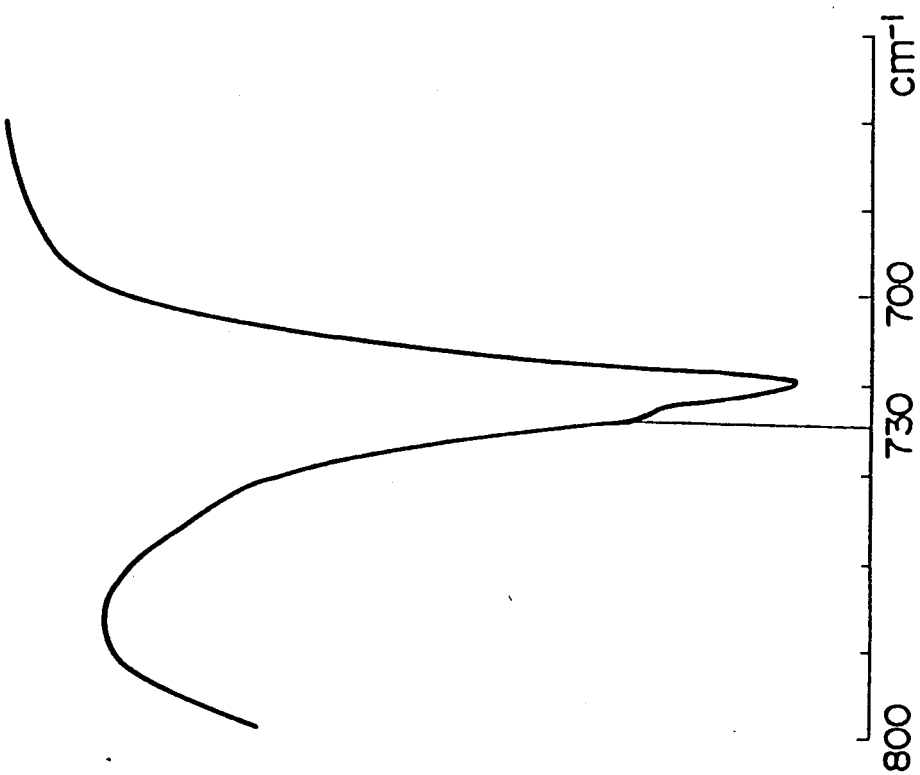

A copolymerization of ethylene and propylene was carried out in the same manner as in Example 1 (II), except that the $(C_8H_{17})_2NTiCl_3$ was replaced with 0.55 millimole of a titanium compound having composition formula $(C_2H_5)_2NTiCl_3$. As the result, 5.5 g of an EP copolymer was obtained. Activity was $9.9 \times 10^3$ g/mole Ti. FIG. 4 illustrates an infrared absorption spectrum of the copolymer thus obtained. In FIG. 4, $IR_{730}$ due to crystalline ethylene chain is observed as a shoulder, demonstrating that it is a copolymer having a broad composition distribution. Ethylene content was 37.9%, $[\eta] = 4.7$, and $d = 0.862$.

COMPARATIVE EXAMPLE 6

A copolymerization of ethylene and propylene was carried out in the same manner as in Example 1 (II), except that the $(C_8H_{17})_2NTiCl_3$ was replaced with 0.5 millimole of a titanium compound having composition formula $(i-C_4H_9)_2NTiCl_3$. As the result, 10.5 g of an EP copolymer was obtained. Activity was $2.1 \times 10^4$ g/mole Ti. In its infrared absorption spectrum, the copolymer thus obtained showed $IR_{730}$ as a shoulder, demonstrating that it was a copolymer having a broad composition distribution. Ethylene content was 71.0%, $[\eta] = 2.6$, and $d = 0.865$.

EXAMPLE 8

(III) Copolymerization of Ethylene, Propylene and Non-conjugated Diene

After replacing the inner atmosphere of a 300 ml flask equipped with a stirrer, a reflux condenser, a gas blowing tube and a thermometer with argon gas, 200 ml of heptane and 1.2 ml (5 millimoles) of triisobutylaluminum were charged. Then, after charging 12.4 ml (100 millimoles) of dicyclopentadiene as a non-conjugated diene, a gas mixture of ethylene and propylene (gas phase composition being $C_2'/C_3' = 2/8$) was introduced into the solution through the blowing tube until a saturation was reached. Then, 0.19 millimole of the titanium compound having the composition formula $(C_8H_{17})_2NTiCl_3$ prepared in Example 1 (I) was added to start a polymerization.

Subsequently, the polymerization was continued for one hour at a constant temperature of 30° C., while supplying the same gas mixture as above, after which 20 ml of ethanol was added to stop the polymerization.

The resulting copolymer was washed three times with each 1,000 ml portion of a mixture consisting of 950 ml of ethanol and 50 ml of 1N hydrochloric acid and dried in vacuum. Thus, 1.2 g of a rubbery ethylene-propylene-diene copolymer was obtained. Activity was $6.3 \times 10^3$ g/mole Ti.

The copolymer thus obtained showed no $IR_{730}$. content of this rubbery copolymer was 62.1%, its iodine number was 16.2, $[\eta]$ was 3.0, and d was 0.900.

EXAMPLE 9

A copolymerization of ethylene, propylene and non-conjugated diene was carried out in the same manner as in Example 8, except that 13.5 ml (100 millimoles) of 5-ethylidene-2-norbornene was used as a non-conjugated diene and 0.25 millimole of the titanium compound having the composition formula $(C_8H_{17})_2NTiCl_3$ prepared in Example 1 (I) was added to start a polymerization. As the result, 1.5 g of a rubbery ethylene-propylene-diene copolymer was obtained. Activity was $6.0 \times 10^3$ g/mole Ti. The copolymer thus obtained showed no $IR_{730}$. Ethylene content was 75.5%, iodine number was 12.1, $[\eta] = 3.8$, and $d = 0.875$.

EXAMPLE 10

A copolymerization of ethylene, propylene and non-conjugated diene was carried out in the same manner as in Example 8, except that 1.2 ml (10 millimoles) of 1,5-hexadiene was used as a non-conjugated diene and 0.19 millimole of the titanium compound having the composition formula $(C_8H_{17})_2NTiCl_3$ was used. As the result, 2.8 g of a rubbery ethylene-propylene-diene copolymer was obtained. Activity was $1.5 \times 10^4$ g/mole Ti. The copolymer thus obtained showed no IR$_{730}$. Ethylene content was 53.0%, iodine number was 8.1, [η]=3.1, and d=0.902.

EXAMPLE 11

(IV) Copolymerization of Ethylene and Butene-1

After replacing the inner atmosphere of a 300 ml flask equipped with a stirrer, a reflux condenser, a gas blowing tube and a thermometer with argon gas, 200 ml of heptane and 1.2 ml (5.0 millimoles) of triisobutylaluminum were charged. Then, a gas mixture of ethylene ($C_2'$) and butene-1 ($C_4'$) (gas phase composition being $C_2'/C_4'=1/8$) was introduced into the solution through the blowing tube until a saturation was reached, after which 0.24 millimole of the titanium compound having composition formula $(C_8H_{17})_2NTiCl_3$ prepared in Example 1 (I) was added to start a polymerization.

Subsequently, the polymerization was continued for one hour at a constant temperature of 30° C., while supplying the gas mixture, and then 20 ml of ethanol was added to stop the polymerization.

The resulting polymer was washed three times with each 1,000 ml portion of a mixture consisting of 950 ml of ethanol and 50 ml of 1N hydrochloric acid and then dried in vacuum to obtain 2.1 g of a rubbery ethylene-butene-1 copolymer. Activity was $8.8 \times 10^3$ g/mole Ti. The copolymer thus obtained showed no IR$_{730}$, demonstrating that it was a copolymer having a narrow composition distribution. Ethylene content of this rubbery copolymer was 60.5%, [η] was 3.7, d=0.865, and $T_g = -69.7°$ C.

EXAMPLE 12

Copolymerization of Ethylene and Decene-1

After replacing the inner atmosphere of a 300 ml flask equipped with a stirrer, a reflux condenser, a gas blowing tube and a thermometer with argon gas, 200 ml of decene-1 and 1.2 ml (5.0 millimoles) of triisobutylaluminum were charged. Then, ethylene gas was introduced into the solution through the blowing tube until a saturation was reached, after which 0.025 millimole of the titanium compound having composition formula $(C_8H_{17})_2NTiCl_3$ prepared in Example 1 (I) was added to start a polymerization.

Subsequently, the polymerization was continued for one hour at a constant temperature of 30° C., while supplying ethylene gas, and then 20 ml of ethanol was added to stop the reaction.

The resulting polymer was washed three times with each 1,000 ml portion of a mixture consisting of 950 ml of ethanol and 50 ml of 1N hydrochloric acid and then dried in vacuum to obtain 1.87 g of a rubbery ethylene-decene-1 copolymer. Activity was $7.5 \times 10^4$ g/mole Ti. The polymer thus obtained showed no IR$_{730}$, demonstrating that it was a copolymer having a narrow composition distribution. The ethylene content was 67.7%, [η] was 3.7, d=0.854, and $T_g = -69.5°$ C.

EXAMPLE 13

Copolymerization of Ethylene, Decene-1 and Non-conjugated Diene

After replacing the inner atmosphere of a 300 ml flask equipped with a stirrer, a reflux condenser, a gas blowing tube and a thermometer with argon gas, 50 ml of decene-1, 1.23 ml (10 millimoles) of dicyclopentadiene and 1.2 ml (5.0 millimoles) of triisobutylaluminum were charged. Then, ethylene gas was introduced into the solution through the blowing tube until a saturation was reached, after which 0.025 millimole of a titanium compound having composition formula $(C_8H_{17})_2NTiCl_3$ prepared in Example 1 (I) was added to start a polymerization.

Subsequently, the polymerization was continued for one hour at a constant temperature of 30° C., while supplying ethylene gas, and then 20 ml of ethanol was added to stop the polymerization.

The resulting polymer was washed three times with each 1,000 ml portion of a mixture consisting of 950 ml of ethanol and 50 ml of 1N hydrochloric acid and then dried in vacuum to obtain 1.13 g of a rubbery ethylene-decene-1-dicyclopentadiene copolymer. Activity was $4.5 \times 10^4$ g/mole Ti.

The copolymer thus obtained showed no IR$_{730}$, demonstrating that it was a copolymer having a narrow composition distribution. The ethylene content was 48.4%, and iodine number was 6.2, [η]=5.15, and d=0.869.

What is claimed is:

1. A catalyst system for polymerization comprising
(A) a liquid catalystic component comprising a titanium compound represented by the general formula

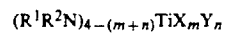

$$(R^1R^2N)_{4-(m+n)}TiX_mY_n$$

wherein $R^1$ and $R^2$ each represents a saturated hydrocarbon group having 8 to 30 carbon atoms, X represents a halogen, Y represents an alkoxy group, m represents a number satisfying $1 \leq m \leq 3$, n represents a number satisfying $0 \leq n \leq 2$, and (m+n) satisfies $1 \leq (m+n) \leq 3$, and
(B) an organoaluminum compound.

2. A catalyst system according to claim 1, wherein the saturated hydrocarbon group having 8 to 30 carbon atoms is an aliphatic saturated hydrocarbon group having 8 to 30 carbon atoms.

3. A catalyst system according to claim 2, wherein the aliphatic saturated hydrocarbon group having 8 to 30 carbon atoms is a straight chain aliphatic saturated hydrocarbon group having 8 to 30 carbon atoms.

4. A catalyst system according to claim 1, wherein the organoaluminum compound (B) is an organoaluminum compound represented by the general formula $R^3{}_aAlM_{3-a}$, or a chain-like or cyclic aluminoxane having a structure represented by the general formula

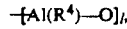

$$\pm Al(R^4)\!-\!O]_l$$

wherein $R^3$ and $R^4$ each represents a hydrocarbon group having 1 to 8 carbon atoms, M represents hydrogen and/or an alkoxy group, a represents a number satisfying $0 < a \leq 3$, and l represents an integer of 2 or greater.

5. A catalyst system according to claim 4, wherein the organoaluminum compound represented by the general formula $R^3{}_aAlM_{3-a}$ is trialkylaluminums, dialkylaluminum hydrides or alkylaluminum alkoxides.

6. A catalyst system according to claim 4, wherein the aluminoxane represented by the general formula $[Al(R^4)\!-\!O]_l$ is tetramethyldialuminoxane, tetraethyldialuminoxane, tetrabutyldialuminoxane, tetrahexyldialuminoxane, methylaluminoxane, ethylaluminoxane, butylaluminoxane or hexylaluminoxane.

7. A catalyst system according to claim 1, wherein the amount of component (B) is 1 to 100,000 moles per one mole of titanium atom in component (A).

* * * * *